US010233893B2

(12) United States Patent
Gilouin et al.

(10) Patent No.: US 10,233,893 B2
(45) Date of Patent: Mar. 19, 2019

(54) BLADE FOR A RUNNER UNIT

(71) Applicant: ALSTOM Renewable Technologies, Grenoble (FR)

(72) Inventors: Jacques Gilouin, La Terrasse (FR); Eleonore Guenot, Grenoble (FR)

(73) Assignee: GE RENEWABLE TECHNOLOGIES, Grenoble (FR)

( * ) Notice: Subject to any disclaimer, the term of this patent is extended or adjusted under 35 U.S.C. 154(b) by 523 days.

(21) Appl. No.: 14/990,956

(22) Filed: Jan. 8, 2016

(65) Prior Publication Data
US 2016/0201638 A1    Jul. 14, 2016

(30) Foreign Application Priority Data
Jan. 13, 2015    (EP) .................................... 15290005

(51) Int. Cl.
*F03B 3/14*    (2006.01)
*F03B 3/12*    (2006.01)
*F03B 13/26*    (2006.01)

(52) U.S. Cl.
CPC .............. *F03B 3/145* (2013.01); *F03B 3/123* (2013.01); *F03B 13/26* (2013.01); *F03B 13/264* (2013.01); *F05B 2230/604* (2013.01); *F05B 2260/74* (2013.01); *Y02E 10/223* (2013.01); *Y02E 10/28* (2013.01); *Y02P 70/525* (2015.11); *Y02P 70/527* (2015.11)

(58) Field of Classification Search
CPC ...... F03D 1/0658; F03D 1/0691; F03D 1/065; F03D 7/0224; F03B 13/264; F03B 13/16; F03B 3/123; Y02P 70/527; Y02P 70/525; Y02E 10/28; Y02E 10/223; F05B 2230/604; F05B 2260/74; B63H 3/002; B63H 2003/004; B63H 2003/088
See application file for complete search history.

(56) References Cited

U.S. PATENT DOCUMENTS 2,951,380 A  *  9/1960  Louarn ................... F03B 3/145
                                              74/36
3,123,145 A     3/1964  Byrd
5,997,253 A    12/1999  Feehan
7,736,127 B1    6/2010  Carr

FOREIGN PATENT DOCUMENTS

DE       197 55 825 C1    2/1999
WO       2013/079638 A1   6/2013

* cited by examiner

*Primary Examiner* — Justin Seabe
*Assistant Examiner* — Brian P Wolcott
(74) *Attorney, Agent, or Firm* — Dority & Manning, P.A.

(57) ABSTRACT

The present invention generally relates to runner unit of a tidal power plant, and more particular to a blade of the runner unit. The blade according to the invention provides a maximised efficiency of energy production of the tidal power plant during functioning of both direct and reverse modes.

13 Claims, 5 Drawing Sheets

BLADE FOR A RUNNER UNIT

CROSS-REFERENCE TO RELATED APPLICATIONS

This application claims priority to European Patent Convention No. 15290005.6 filed Jan. 13, 2015, the contents of which are hereby incorporated in its entirety.

TECHNICAL FIELD

The present invention generally relates to runner unit of a tidal power plant, and more particular to a blade of the runner unit.

BACKGROUND

As well known, tidal power plants are arranged to convert into electricity the energy of tides. To this purpose, in case of a tidal lagoon, turbine housing may be arranged between the sea and the lagoon basin. The turbine housing may include a bulb runner unit comprising a plurality of blades fit thereon which are moved by the flow of water. The bulb runner is integral to a rotating shaft which cooperates with an electricity generator.

Depending on the tidal level, when the water level (also known as "head") of the sea rises with respect to the level of the lagoon, water can start flowing through the turbine to produce energy. Similarly, as the sea level starts to fall, a tidal head can be created by holding water back in the lagoon until a sufficient head is formed. Thus the process can be reversed and the water flows in the opposite direction from the lagoon to the sea through the turbine. In this way the generation of electricity is maximised, as it occurs with the flow of water in both senses.

However, the blades fit to the bulb unit usually have a fixed direction with respect to the flow of water. The consequence of such fixed arrangement usually ensures an acceptable efficiency when the runner is operating in the direct mode, which is when the water flows from the lagoon to the sea, but at the same time a significant decrease of efficiency is experienced when operating in the reverse mode, since the same inclination of the blades is maintained in both operating modes.

SUMMARY

It is an object of the present invention to solve the aforementioned technical problem by providing a blade for a runner unit as substantially defined according to independent claim 1.

It is a further object of the present invention to provide a runner unit as substantially defined in dependent claim 13. According to an aspect of the invention, this object is obtained by a blade of a runner unit for a tidal plant, the runner unit including a hub body, the blade (1) comprising an airfoil rotatably connected to the hub body and comprising reversible locking means adapted to block/release the blade in correspondence of at least two angular operative positions.

According to another aspect of the invention, the blade is connected to the hub body through a rotative servomotor, adapted to cooperate with the reversible locking means such to block the blade in at least two angular operative positions.

According to another aspect of the invention, the servomotor comprises a cylinder integral to the hub body and a rotative piston hosted therein and connected to the airfoil.

According to another aspect of the invention, the rotative piston comprises a protrusion abutting against an inner wall of the cylinder and such to define first and second separated chambers between the piston and the cylinder.

According to another aspect of the invention, the servomotor further comprises a fluid feeding means.

According to another aspect of the invention, the fluid feeding means comprises a first pipe adapted to feed/release pressurized fluid to the first chamber and a second pipe adapted to feed/release pressurized fluid to the second chamber such to move the piston between the two angular positions.

According to another aspect of the invention, the rotative servomotor comprises a lever element adapted to engage/disengage the reversible locking means.

According to another aspect of the invention, the lever element is connected to the piston by bolting. Alternatively, the piston and lever element may be formed as one-piece, for example by forging.

According to another aspect of the invention, the servomotor is connected to a trunnion portion of the blade.

According to another aspect of the invention, the reversible locking means comprises a retractable locking pin mounted on the hub.

According to another aspect of the invention, the locking means comprises a locking mechanism associated to the locking pin, the locking mechanism configured to move the locking pin from a locking position to a releasing position and vice versa.

According to another aspect of the invention, the locking pin is configured to engage/disengage the lever element when the blade is in the two angular operative positions.

BRIEF DESCRIPTION OF THE DRAWINGS

The objects, advantages and other features of the present invention will become more apparent upon reading of the following non-restrictive description of embodiments thereof, given for the purpose of exemplification only, with reference to the accompany drawing, through which similar reference numerals may be used to refer to similar elements, and in which.

An exemplary preferred embodiment will be now described with reference to the aforementioned drawings.

DETAILED DESCRIPTION

Figure 1:
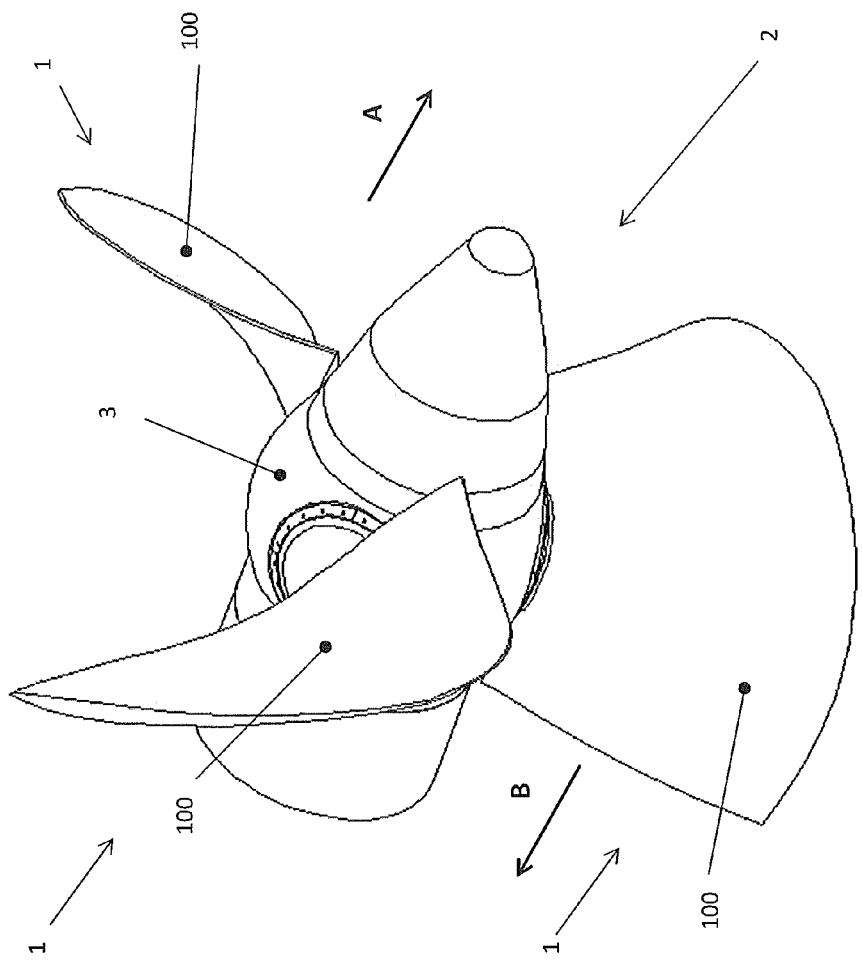
FIG. 1 shows a perspective view of a runner unit including a plurality of blades according to the present invention.

With reference to FIG. 1, it is shown a runner unit, generally indicated with reference numeral 2. The runner unit 2 is located within a tidal power plant which may be positioned between the sea and a lagoon basin (arrangement not shown). Runner unit 2 includes a hub body 3 to which a plurality of blades 1 are fitted. Blade 1 comprises an airfoil 100 and is mounted on the hub body 3 and moved by a flow of water which may occur in a direct mode, that is from the lagoon to the sea along verse indicated by arrow A, and in a reverse mode, that is from the sea to the lagoon along verse indicated by arrow B.

The following description is directed to a single blade 1, but it will be appreciated that the same may apply to all blades of the runner unit 2.

Figure 2:
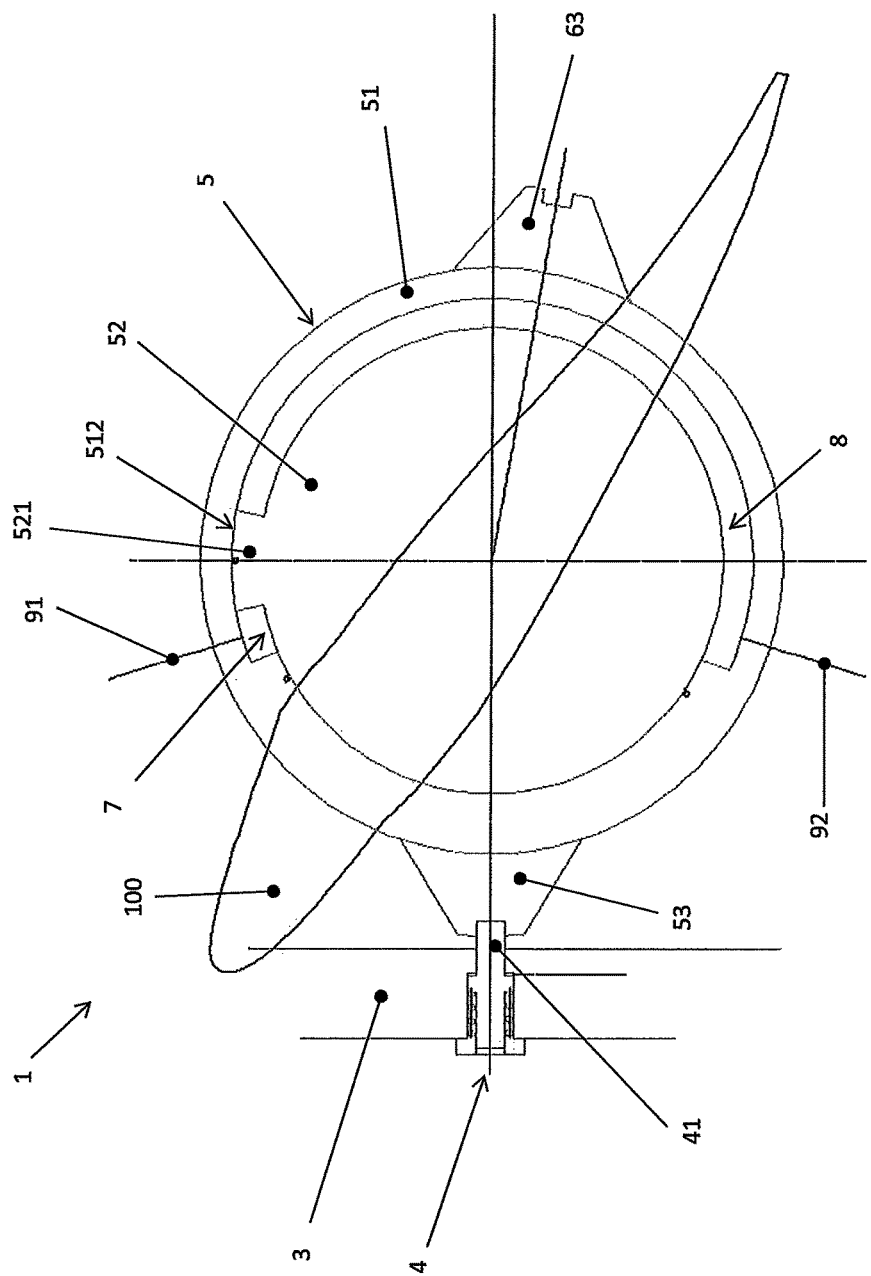
FIG. 2 shows a top schematic view of a blade according to the present invention.

Making now reference to following FIG. 2, it is shown a top schematic view of a blade 1 of FIG. 1. Blade 1 is, as it will be clear from the following detailed description of an exemplary and non-limiting embodiment, rotatably connected to the hub body 3 and comprises reversible locking means 4 adapted to block/release the blade 1 in correspondence of at least two angular operative positions. In the application herewith shown, the blade 1 operates in two different flow conditions, that is water flowing in direct mode and water flowing in reverse mode, the latter having an opposite verse with respect to the direct mode. For this reason, blade 1 is arranged such to present two distinct angular positions in which it is blocked by locking means 4. In this exemplary embodiment, blade 1 is rotatably connected to hub body 3 through a rotative servomotor 5, which is adapted to cooperate with locking means 4 such to displace and block the blade 1 in correspondence of the two angular operative positions. More in particular, servomotor 5 includes a cylinder 51 integral to the hub body 3 and a rotative piston 52 which is hosted in the cylinder 51 and integral to the airfoil 100. As visible in the figure, the rotative piston 52 comprises a protrusion 521 which abuts against an inner wall 512 of the cylinder 51. The presence of the protrusion 521 establishes a first chamber 7 and a second chamber 8, fluidly separated from the first chamber 7, both defined between the rotative piston 52 and the cylinder 51. The servomotor 5 further comprises a pressurized fluid feeding means which includes a first pipe, schematically depicted and indicated with reference numeral 91, adapted to feed/release pressurized fluid, such as oil, to the first chamber 7 and a second pipe 92 which is adapted to feed/release pressurized fluid to the second chamber 8. The feeding of pressurized fluid in chamber 7 together with the release of pressurized fluid from chamber 8 determines the rotation of the piston 52 in clockwise direction. Conversely, the release of pressurized fluid in chamber 7 together with the feeding of pressurized fluid from chamber 8 determines the rotation of the piston 52 in pressurized clockwise direction.

Still with reference to FIG. 2, servomotor 5 comprises lever elements 53 and 63, which, in this exemplary case, are positioned around the rotative piston 52 at two distinct angular locations. Lever elements 53, 63 may be connected to the piston 52 by bolting.

Each lever element 53 and 63 is advantageously adapted to engage/disengage the reversible locking means 4. Advantageously, locking means 4 comprises a retractable pin 41 mounted on the hub body 3.

FIG. 2 depicts the blade 1 when positioned in the direct operating mode. Lever 53 engages locking pin 41 and maintains the blade in a fixed orientation with respect to the hub body 3. The blade efficiently operates in this configuration in the direct mode, that is when the flow of water goes from the lagoon to the sea. When the verse of the flow of water reverses, flowing in opposite direction (from the sea to the lagoon), the orientation of the blade with respect to the hub body 3 is advantageously changed to maximise efficiency.

To this purpose, locking pin 41 is retracted (as it will be explained with reference to the following figure) this way disengaging lever element 53, and at the same time fluid feeding means associated to servomotor 5 determines, by feeding pressurized fluid to chamber 7 and releasing pressurized fluid from chamber 8, the rotation of the piston 52 and the airfoil 100 in a clockwise direction. The rotation of the airfoil 100 occurs until lever element 63 engages locking pin 41, blocking the blade in the other operative reverse mode position.

Figure 3:
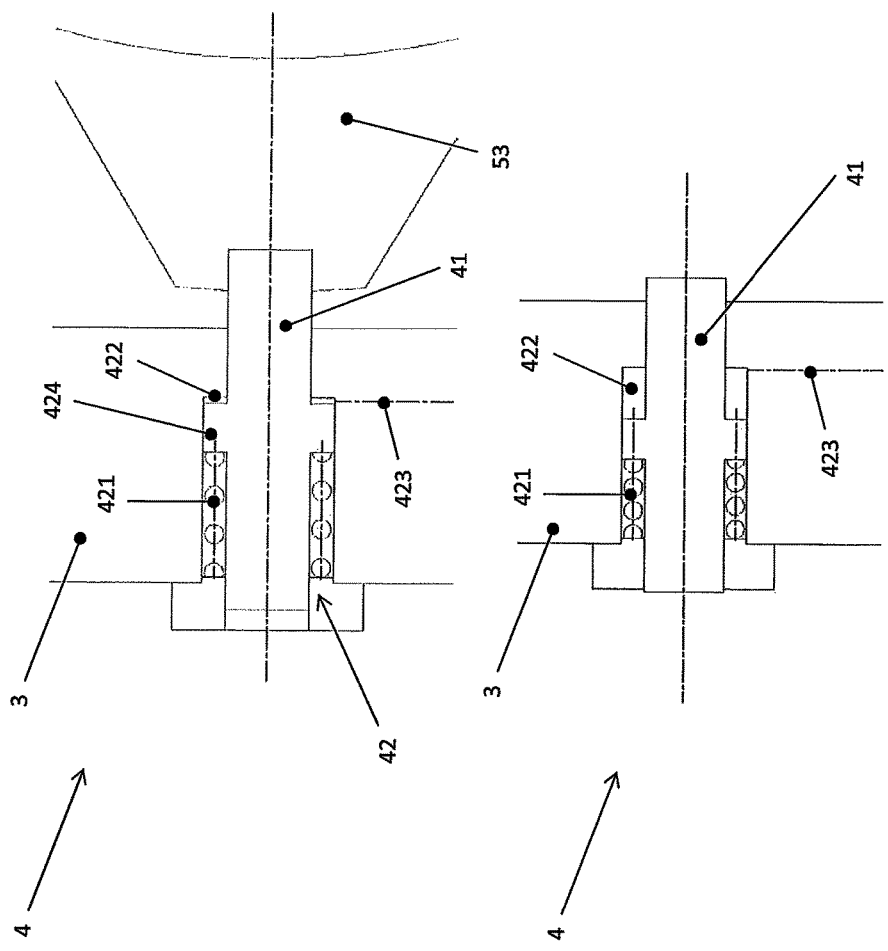
FIG. 3 shows a particular of FIG. 2.

With now reference to following FIG. 3 it is shown in more detail the reversible locking means 4 mounted on the hub body 3. In particular, reversible locking means 4 comprises the retractable locking pin 41 and a locking mechanism, generally indicated with numeral 42, associated to the locking pin 41 and configured to move locking pin 41 from a locking position, in which it engages the lever element (FIG. 3 above), to a releasing position in which the lever element is disengaged and free to rotate (FIG. 3 bottom). in this non-limiting example, locking pin 41 is slidable into a recess engraved in the hub body 3 and comprises a protuberance 424 providing a stepped region. Locking mechanism 42 includes a spring element 421 provided on the locking pin 41 exerting a resilient action, and a chamber 422 defined on the opposite side of the protrusion 424 between the pin 41 and the recess, the chamber 422 being fluidly to connected to a pipe 423 for feeding/releasing pressurized fluid, such as oil. Feeding pressurized oil in the chamber 422 determines the compression of the spring element 421 and consequently the retraction towards the hub body 3 of the locking pin 41 (FIG. 3 bottom). In the same way, the release of pressurized fluid from chamber 422 disposes for the predominance of the resilient action of spring element 421 determining the outward movement of the pin 41 and the consequent engaging with lever element (FIG. 3 top).

As an alternative to the embodiment described, the locking pin 41 may be actuated by two fluid chambers disposed opposite to protrusion 424. More specifically, spring element 421 would be replaced by a fluid chamber similar to the fluid chamber 422; spring reaction and consequent movement of the locking pin 41 would he actuated by feeding/release of pressurized fluid therein.

Figure 4:
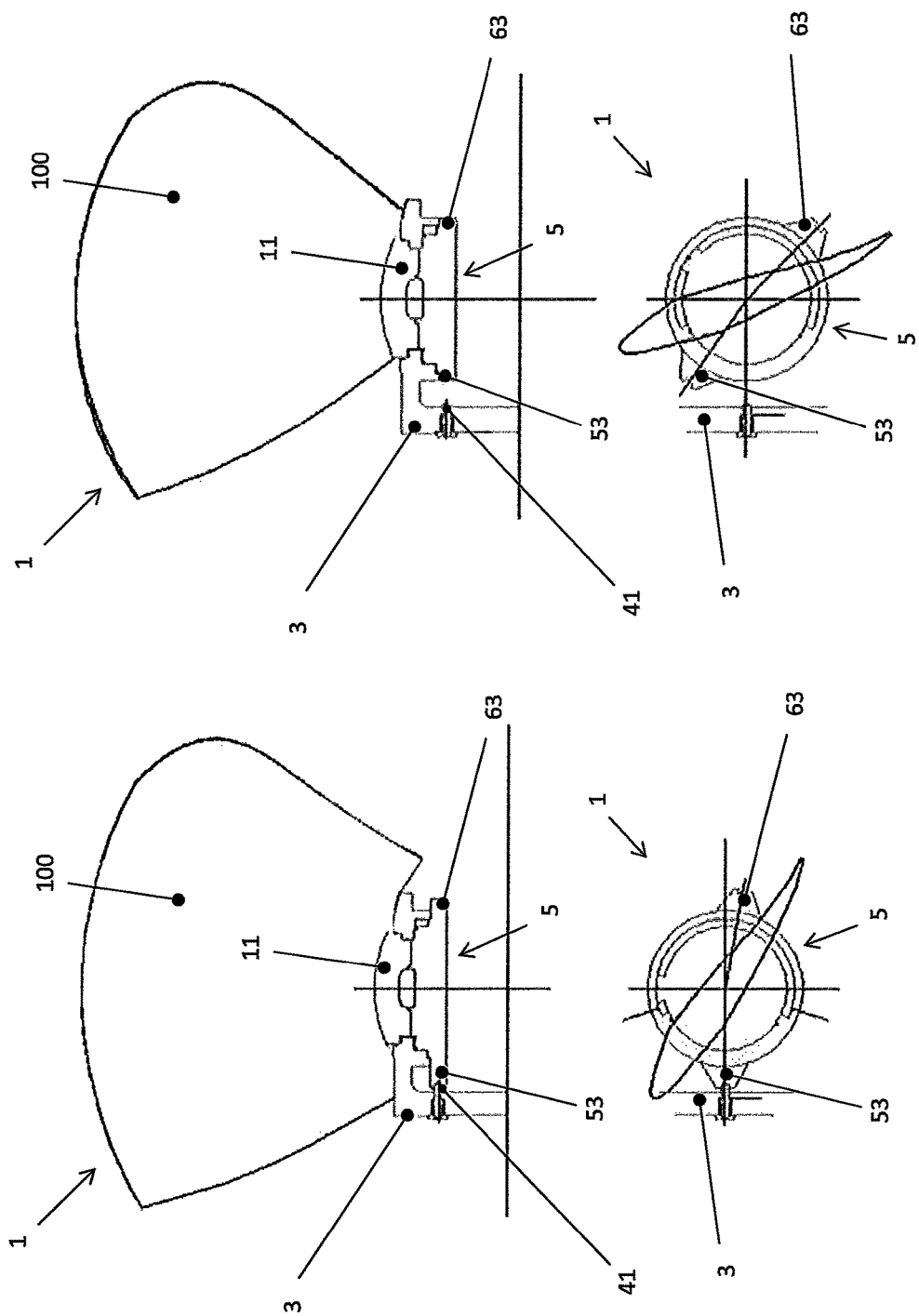
FIGS. 4 and 5 show an operational sequence of the blade according to the present invention.
Figure 5:
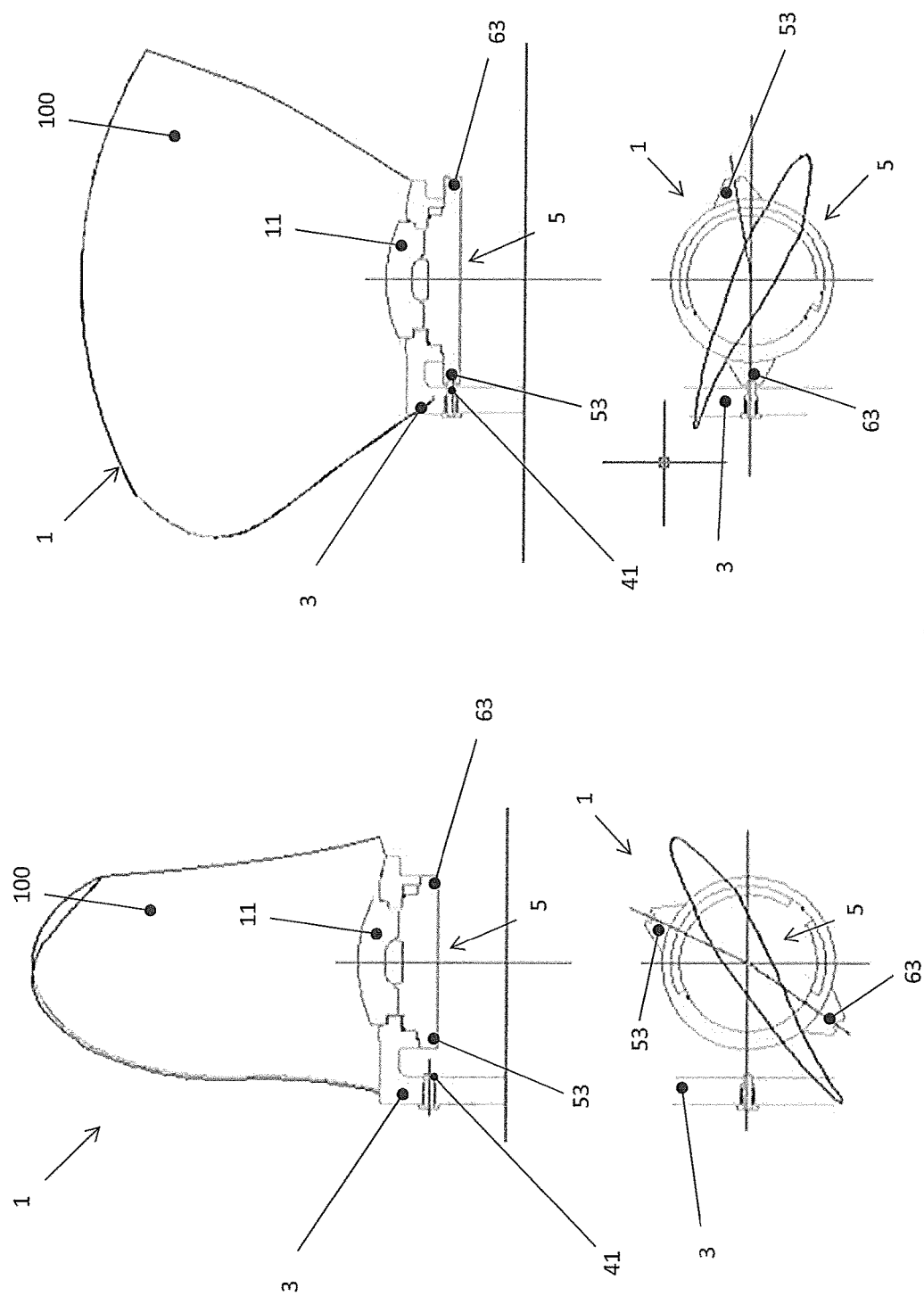

With reference to FIGS. 4 and 5, it is shown an operational sequence of the blade 1 according to the invention. In particular, FIG. 4 left side shows the blade 1 located in the angular position corresponding to the direct operational mode. Lever element 53 engages locking pin 41 and the blade is blocked in such angular position. The piston of the servomotor 5 is advantageously connected to a trunnion portion 11 of the blade 1.

When a change of blade orientation is needed, locking mechanism retracts locking pin 41 which disengages lever element 53 and servomotor 5 determines the rotation of the piston in a clockwise direction and of the airfoil 100 (FIG. 4 right).

FIG. 5, left side, shows the lever element 63 approaching locking pin 41 during the rotation of the servomotor 5.

Finally, FIG. 5 right side shows the lever element 63 engaging locking pin 41 and therefore the blade being rotated and blocked in the second operative position corresponding to the reverse operational mode.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate is with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A blade of a runner unit for a tidal plant, the runner unit including a hub body, the blade comprising:
   an airfoil rotatably connected to the hub body; and
   reversible locking means adapted to block said blade in at least two angular operative positions, wherein said reversible locking means comprises:
      a retractable locking pin mounted on said hub, and
      a locking mechanism configured to move said locking pin from a locking position to a releasing, position and vice versa,
   wherein said blade is maintained in a fixed orientation with respect to said hub body when said locking pin is in said locking position.

2. The blade according to claim 1, wherein said blade is connected to said hub body through a rotative servomotor, said rotative servomotor adapted to cooperate with said reversible locking means to displace and block the blade in said at least two angular operative positions.

3. The blade according to claim 2, wherein said servomotor comprises a cylinder integral to the hub body and a rotative piston hosted in said cylinder and connected to said airfoil.

4. The blade according to claim 3, wherein said rotative piston comprises a protrusion abutting against an inner wall of said cylinder and such to define a first and a second separated chambers between said piston and said cylinder.

5. The blade according to claim 2, wherein said servomotor further comprises a pressurized fluid feeding means.

6. The blade according to claim 5, wherein said fluid feeding means comprises a first pipe adapted to feed and/or release pressurized fluid to said first chamber and a second pipe adapted to feed and/or release pressurized fluid to said second chamber such to move said piston between said two angular positions.

7. The blade according to claim 2, wherein said rotative servomotor comprises a lever element adapted to engage and/or disengage said reversible locking means.

8. The blade according to claim 7, wherein said lever element is connected to said piston by bolting.

9. The blade according to claim 2, wherein said servomotor is connected to a trunnion portion of said blade.

10. The blade according to claim 1, wherein said locking pin is configured to engage and/or disengage a lever element when the blade is in said two angular operative positions.

11. A runner unit for a tidal power plant, comprising at least a blade according to claim 1.

12. The blade according to claim 10, wherein said locking pin is configured to engage said lever element when said locking pin is in said locking position.

13. The blade according to claim 1, wherein said locking mechanism includes a chamber fluidly connected to a pipe for feeding and/or releasing pressurized fluid to said chamber, said locking pin being movable between said releasing position and said locking position by feeding pressurized fluid into and/or by releasing pressurized fluid from said chamber.

* * * * *